(12) United States Patent
Geiger et al.

(10) Patent No.: US 12,173,451 B2
(45) Date of Patent: Dec. 24, 2024

(54) ARRANGEMENT AND METHOD FOR DEGASSING A PUMP

(71) Applicant: ANDRITZ OY, Helsinki (FI)

(72) Inventors: Ronny Geiger, Curitiba (BR); Kari Peltonen, Kotka (FI)

(73) Assignee: ANDRITZ OY, Helsinki (FI)

( * ) Notice: Subject to any disclaimer, the term of this patent is extended or adjusted under 35 U.S.C. 154(b) by 618 days.

(21) Appl. No.: 17/297,942

(22) PCT Filed: Nov. 28, 2019

(86) PCT No.: PCT/FI2019/050853
§ 371 (c)(1),
(2) Date: May 27, 2021

(87) PCT Pub. No.: WO2020/109667
PCT Pub. Date: Jun. 4, 2020

(65) Prior Publication Data
US 2022/0025578 A1 Jan. 27, 2022

(30) Foreign Application Priority Data
Nov. 30, 2018 (FI) .................................. 20186026

(51) Int. Cl.
| | |
|---|---|
| *D21D 5/26* | (2006.01) |
| *B01D 19/00* | (2006.01) |
| *D21C 7/08* | (2006.01) |
| *D21C 9/10* | (2006.01) |

(Continued)

(52) U.S. Cl.
CPC ........... *D21D 5/26* (2013.01); *B01D 19/0052* (2013.01); *B01D 19/0063* (2013.01);
(Continued)

(58) Field of Classification Search
CPC ........ D21D 5/26; D21D 5/28; B01D 19/0052; B01D 19/0063; B01D 19/0068;
(Continued)

(56) References Cited

U.S. PATENT DOCUMENTS 4,684,442 A * 8/1987 Meredith ............... D21C 9/147
162/57
5,006,133 A * 4/1991 Mandrin ............ B01D 19/0005
95/263
(Continued)

FOREIGN PATENT DOCUMENTS

| CA | 1 214 686 | 12/1986 |
|---|---|---|
| JP | S5885392 | 5/1983 |

(Continued)

OTHER PUBLICATIONS

Japanese Patent App. 2021-530847, Office Action (Jun. 30, 2023(8 pages).

(Continued)

*Primary Examiner* — Jacob T Minskey
*Assistant Examiner* — Stephen M Russell
(74) *Attorney, Agent, or Firm* — Nixon & Vanderhye P.C.

(57) ABSTRACT

An arrangement and a method for controlling a gas flow separated from a suspension of medium consistency pulp. The pulp is treated in a pulp treatment apparatus including a first pump and a second pump, wherein the second pump is a degassing centrifugal pump provided with a degassing system including a degassing conduit in which a degassing valve is arranged for regulating a pressure difference between an inlet of the second pump and the degassing conduit. The degassing system further includes a pressurized degassing vessel working under overpressure and having an inlet and an outlet, wherein the outlet of the vessel is connected to a pressure control valve for maintaining a desired overpressure in the vessel.

10 Claims, 4 Drawing Sheets

(51) Int. Cl.
*D21C 9/18* (2006.01)
*D21D 5/28* (2006.01)
*F04D 7/04* (2006.01)
*F04D 13/12* (2006.01)

(52) U.S. Cl.
CPC ........... *B01D 19/0068* (2013.01); *D21C 7/08* (2013.01); *D21C 9/1005* (2013.01); *D21C 9/18* (2013.01); *D21D 5/28* (2013.01); *F04D 7/045* (2013.01); *F04D 13/12* (2013.01)

(58) Field of Classification Search
CPC .......... D21C 7/08; D21C 9/1005; D21C 9/18; F04D 7/045; F04D 13/12
See application file for complete search history.

(56) References Cited

U.S. PATENT DOCUMENTS

| | | |
|---|---|---|
| 5,087,171 A | 2/1992 | Dosch et al. |
| 9,669,331 B2 | 6/2017 | Kamke |
| 9,784,275 B2 | 10/2017 | Michal |

FOREIGN PATENT DOCUMENTS

| | | | | |
|---|---|---|---|---|
| JP | 2001316993 | | 11/2001 | |
| RU | 2318575 | | 4/2007 | |
| RU | 2531746 | | 10/2014 | |
| RU | 2561344 | | 11/2014 | |
| WO | 199203611 | | 3/1992 | |
| WO | WO9203611 | * | 3/1992 | ......... B01D 19/0052 |
| WO | WO-9203611 A | * | 3/1992 | ......... B01D 19/0052 |

OTHER PUBLICATIONS

International Search Report for PCT/FI2019/050853 dated Feb. 20, 2020, 3 pages.
Written Opinion of the ISA for PCT/FI2019/050853 dated Feb. 20, 2020, 7 pages.
Search Report cited in 2021118687/05 (with Translation) completed Dec. 8, 2022, 4 pages.
Office Action cited in 2021118687/05 mailed Dec. 8, 2022, 5 pages.

* cited by examiner

ARRANGEMENT AND METHOD FOR DEGASSING A PUMP

RELATED APPLICATION

This application is the U.S. national phase of International Application PCT/FI2019/050853 filed Nov. 28, 2019, which designated the U.S. and claims priority to Finnish Patent Application 20186026 filed Nov. 30, 2018, the entire contents of each of which are hereby incorporated by reference.

FIELD OF THE INVENTION

The invention is in the field of medium consistency (MC) pumps used to pump suspensions of pulp through pulping and paper production industrial plants.

BACKGROUND OF THE INVENTION

Medium consistency (MC) pumps are widely used in pulp and paper production. Medium consistency pulp is a suspension of cellulosic fibers and reaction by-products in water, where the cellulosic mass content (consistency) is determined as having a consistency in a range of 6-16%, but more typically the consistency range is 8-12%. The pump for medium consistency pulp is designed for pumping and transferring the pulp in various pulp and paper industry applications.

Due to the physical nature of the medium consistency pulp air or gas can be trapped into the suspension and can defeat centrifugal pumping unless proper degassing is performed. Therefore, the MC pump is equipped with a gas removal system that was invented in the early 1980's. In addition to fluidization of pulp, the understanding of the need of degassing was the key features in inventing the MC pump. During the centrifugal pumping operation, the centrifugal force applied to the MC pulp promotes the separation between the trapped gases and the water/pulp suspension. The separation occurs because the gas density is substantially smaller than the other components of the MC pulp, and therefore the gases tend to accumulate in the center of the rotating impeller. If the accumulated gases are not removed from the pump, additional separated gas will accumulate and the gas volume inside the pump will increase, and the pump will dramatically loose efficiency and pumping stability. A suitable discharge gas flow must be maintained. The MC pump degassing is based on the pumping behavior of a centrifugal pump and developing a positive pressure differential between the pump inlet and the pump degassing line. This is achieved either by a sufficient inlet pressure or by external or internal vacuum pump. The finding that an MC pump accumulates air into the pump and thus the pumping effect reduces leads to the current degassing system that is in use in several types of MC pumps nowadays.

Typically an MC pump is used to feed a pulp washer, a bleaching stage or storage towers. In some applications there is a need to use one or several MC pumps in series, for example if one MC pump is not giving a high enough pressure. In pressurized bleaching stages (e.g. oxygen delignification and PO stages) the MC pump must generate a high enough pressure on the pulp line, in order to achieve the required reactor process pressure. Another pump (booster pump) in series can be needed to achieve the required pressure. In some cases the need for a booster MC pump can occur if the pressure required for steam or chemical (e.g. peroxide) feeding into the process is not high enough. In this kind of conditions chemicals or steam can be fed in the inlet side of the booster pump and then the booster pump generates the pressure needed to meet the process conditions.

In typical installations, the suction side of the MC pump is fed by a storage tower or a small feed tank. In this application, the MC pump feed pressure is stable, and the feed pressure changes are slow. In addition, the gas content in the MC pump feed pulp does not fluctuate drastically during normal operation. The driving force to remove accumulated gases from the MC pump is the pressure difference between the MC pump suction and the atmosphere or between the MC pump suction and the degassing device of the MC pump. In typical installations, both the pressure difference and the degassing flows are relatively stable, and therefore the degassing system design and operation are well known, and its performance is well proven.

In a booster MC pump application the inlet pressure of the pump is quite high; about 1-10 bar, but normally 2-6 bar. In many cases a booster MC pump can work without a degassing system, but if the conditions are such that gas removal is needed, the MC pump is equipped with gas removal. The use of degassing may be needed because of gaseous chemical addition to the pulp upstream of the pump. Another reason for degassing is gaseous reaction products which are generated in the reactor and enter along with the pulp the booster pump located downstream of the reactor. This kind of conditions are typical for example in a two vessel oxygen delignification stage, if a booster MC pump is required to feed the pulp into a second oxygen reactor.

FIG. 1 presents a simplified flow sheet of a two stage oxygen delignification system. The system comprises a feed MC pump 3, a mixer 4 into which oxygen and steam are fed through line 12, and a first reactor 5, and a conduit 6 to a second reactor 7. The conduit 6 between the reactors comprises a second (booster) MC pump 8, and a second oxygen mixer 9. Pulp falls into a drop leg 2 and is further transferred by the pump 3, into which chemicals may also be fed. The main part of the oxygen dosage fed into the first reactor is consumed in the reactor, but some amount of residual oxygen and gaseous reaction products will enter the booster MC pump 8. Oxygen and steam through line 13 are added into the pulp. Steam may be added also before the booster pump 8 through line 14. The MC pump head requirement can be too high for the available steam or reactant pressures, and thus the head generation is divided between two pumps 3 and 8, the second pump is added as a booster pump. The both pumps 3 and 8 are degassing MC pumps equipped with a degassing conduit 10 and 11, respectively. The oxygen delignified pulp is discharged from the second reactor 7 through line 15.

Sometimes the oxygen consumption in the reactor varies because of changing process conditions, or there is overdosage of oxygen, or an addition of steam is arranged before the booster pump. In any case, the gas content in the inlet of the booster pump is very difficult to estimate and it will vary within a wide range, which makes the control of degassing difficult. Therefore there would be from time to time a fiber leakage through a degassing valve of the degassing conduit, and if the degassing is insufficient, also pumping problems and unstable process conditions will occur. If the amount of off-gas through the degassing of the MC pump is not high enough, the gas content in the booster MC pump will increase, which reduces head generation of the pump and hampers the operation of the pump. If the gas content fluctuates in the inlet of the pump, the head generation of the pump starts to fluctuate. Gas accumulation in the inlet side of an MC pump reduces the head generation, but also causes cavitation and vibration of the pump. In booster MC pump installations, both the pressure difference and the degassing flow ranges are big, and the operation conditions can change fast. Therefore the degassing system operation is easily unstable in these applications.

In an MC pump air or gas is separated from the pulp, and then removed by creating a certain pressure difference between the inlet side and the degassing chamber of the pump. Typically the degassing system of a booster MC pump 20 (FIG. 2a) consists of pressure measurements in the inlet 21 of the pump 20 and in the degassing conduit 22 that is connected to the degassing chamber of the pump. Pulp is removed from the pulp through a conduit 23. The degassing conduit 22 (gas discharge conduit) comprises a degassing valve 24. The difference in pressure between the inlet of the pump and the degassing (gas discharge) is measured by a pressure gauge. The difference is compared with a set value and the degassing valve is controlled by a pressure differential indicator controller (PDIC) to maintain differential pressure at a desired level. The outlet of the degassing conduit is connected to the ambient air or to the ventilation system (not shown).

FIG. 2b shows a known system in which the degassing conduit is connected to a water separation vessel, which operates also as a silencer. The water separator 25 has a conduit 26 to a ventilation system or atmosphere. The water separator in which water is removed from the separated gas is also equipped with a drainage connection 27 for regulating a liquid level in the water separator vessel 25.

SUMMARY OF THE INVENTION

The experience of existing booster MC pump applications has shown that there is a need to provide a control system and method which are capable of functioning under varying process conditions so that a booster MC pump degassing system can be stabilized.

As described above, the off-gas amount is controlled by the degassing valve that gets an indication for the opening from the pressure measurements in the inlet side of the pump and in the degassing conduit of the pump. Principally, if the measured pressure difference between the measurements is low, there is a lot of gas in the pump. If the pressure difference is high, no gas is coming into the pump. Thus, based on these pressure measurements, it is possible to roughly estimate the gas content in the pump and to create a configuration on how the degassing valve should operate under different pressure conditions. Since the conditions in the inlet side of the pump can change very quickly the degassing valve should be operating also fast. On the other hand, a too fast operation of the degassing valve will easily lead to a high leakage of pulp fibers with the gas and to different kinds of problems in the off-gas treatment. If the degassing valve is too slow, the gas content in the pump can increase too much, causing head loss and pressure and flow fluctuations to the process.

The present invention relates to an arrangement for controlling gas flow separated from a suspension of medium consistency pulp, which is treated in a pulp treatment apparatus comprising at least a first pump and a second pump. The second pump is a degassing centrifugal pump and works as a booster pump. The second pump is provided with a degassing system which typically comprises a degassing (gas discharge) conduit in which a degassing valve is arranged for regulating the pressure difference between the pump inlet and the degassing conduit. The degassing conduit is connected to a pressurized degassing vessel working under overpressure and having an inlet and an outlet, wherein the outlet of the vessel is connected to a pressure control valve for maintaining an overpressure in the vessel. The degassing conduit is connected to the inlet of the vessel. The pressurized degassing vessel may be a pipe which is located horizontally and has a sufficient diameter and length. The vessel may further be connected through an outlet conduit to a separate unpressurized water separation chamber having a liquid level and a gas space above the liquid level and a drainage conduit for regulating a liquid level in the chamber. The water separator chamber further comprises a vent conduit for providing an outlet for separated gas. A pressure control valve is provided in the outlet conduit between the pressurized degassing vessel and water separation chamber to maintain a required overpressure in the pressurized degassing vessel. The pressurized degassing vessel is a pipe having a diameter greater than 50 mm, preferably greater than 80 mm. The ratio of pipe length to pipe diameter is preferably 20-100.

When the pressurized degassing vessel is a pipe, at least a portion of the inlet line (degassing conduit) and at least a portion of the outlet line travel vertically. Preferably, the degassing valve of the inlet line is located at a higher elevation than the pressure control valve of the outlet line. The pipe-like pressurized degassing vessel is located at a lower elevation than both valves, i.e. the pressure control valve and the degassing valve.

According to another aspect of the present invention the pressurized degassing vessel may be a pressurized water separator chamber having a liquid level and a gas space above the liquid level and a drainage conduit. The drainage conduit is provided with a valve for regulating a liquid level in the chamber, i.e. in the pressurized degassing vessel. The vent conduit is provided with a pressure control valve to maintain a required overpressure in the vessel. The pressurized water separator is located at a lower elevation than both valves, i.e. the pressure control valve and the degassing valve.

The drainage conduit of the pressurized degassing vessel may be provided with a pump, preferably with a self-priming pump. The self-priming pump is able to remove a possible blockage between the valve of the degassing conduit and drainage valve of the vessel.

The first pump is also typically a degassing centrifugal pump for medium consistency pulp.

In the new method for controlling a gas flow separated from a suspension of medium consistency pulp the pulp suspension is treated in a pulp treatment apparatus comprising at least a first pump and a second pump. The pulp is pumped by the first pump and then the second pump for raising the pressure of the pulp. The gas separated from the pulp suspension in the second pump is discharged through a degassing conduit. The second pump is working at a high inlet pressure, 2-6 bar. The pressure difference is determined between the inlet of the second pump and the degassing conduit. A degassing valve connected to the degassing conduit is operated in accordance with the pressure difference to maintain the pressure difference value within a given range. The gas is led from the degassing conduit to a pressurized degassing vessel working under overpressure. There is liquid, typically water, in the lower portion of the vessel, and a gas space above the liquid level. When the pressurized degassing vessel works also as a water separation chamber, a vent conduit is provided with a valve for maintaining a desired overpressure in the vessel. If the pressurized degassing vessel is a pipe located before a water separator chamber, the outlet conduit between the vessel and the chamber is provided with a valve for maintaining a desired overpressure in the vessel. The overpressure in the vessel and volume of the vessel allow damping quick pressure changes over the degassing valve.

The first pump used in the method is also typically a degassing centrifugal pump for medium consistency pulp.

In known booster MC pump applications the off-gas is led to the water separator and from there to the atmosphere or to the ventilation system and the back pressure is close to atmospheric pressure, which leads to a high pressure difference over the degassing valve. The known system cannot react to quick changes sufficiently. In the new degassing system the off-gas is led to a pressurized degassing vessel that is working under overpressure. The pressure in the vessel is adjusted to a value that is in relation to the process pressure in the inlet of the MC pump. The pressure in the degassing vessel that can be a pipe having a sufficient diameter and length or a water separation chamber is preferably adjusted to a range of 0.1-4.0 bar (g), preferably 0.3-3 bar (g). The pressure in the inlet side (suction side) of the booster MC pump is typically 2-5 bar(g). If the inlet pressure of the booster MC pump is about 5 bar(g), the pressure in the water separation chamber is about 3.5 bar(g).

It is essential that the total volume of the pressurized degassing vessel that can be a pipe or a water separation chamber is sufficiently large. The total volume is typically in a range of 0.01-1.0 $m^3$, preferably 0.02-0.2 $m^3$. The gas volume and the pressure of the pressurized degassing vessel are dependent on the desired damping effect of the vessel so that both the gas volume and the pressure can be controlled. The pressure is controlled by the valve in the outlet conduit of the pressurized degassing vessel that can be a pipe or a water separation chamber. If the water separator is used as a degassing vessel, the gas volume is controlled with the liquid level control (LIC) circuit in the drainage conduit. If the degassing vessel is a pipe and it has an outlet conduit with a pressure control valve to the water separator, the water level in the water separator can be adjusted with an over flow pipe. The total volume of the pressurized degassing vessel, i.e. pipe or water separator, has to be large enough so that pressure and gas fluctuations can be damped and fiber leakage through the degassing valve is prevented.

When the off-gas back pressure is controlled in the new system working under higher pressure, the volume flow of the off-gas is smaller, which will reduce the capability of the off-gas flow to take along pulp fibers. The opening of the degassing valve is typically in the same range as in the known system, although the gas volume flow rate is smaller but the pressure difference is also lower. This means that the off-gas velocity in the degassing piping of the pump and in the degassing valve is smaller. Smaller off-gas velocities in the degassing system are preferable, since it reduces the risk to get pulp fibers entrained in the discharged gas flow. If there are changes in the pressure or gas volumes in the inlet side of the MC pump, the pressurized degassing vessel enables to keep the pressure difference over the degassing valve stable. The damping effect of the degassing vessel is related to the volume and the back pressure in the vessel that can be controlled by the water level and an off-gas valve installed to the equipment.

The new pressurized degassing vessel that works under overpressure can be used with all existing MC booster pump applications if there is a degassing valve in use and sufficient pressure or pressure difference measurements that control the opening of the degassing valve. The pressurized degassing vessel is installed preferably in the vicinity of the MC pump.

The new method and arrangement are typically used in pulp treatment processes, in which the pulp is treated with gaseous chemicals at pressurized conditions. Typical processes are oxygen delignification and bleaching with ozone or peroxide. Oxygen delignification refers to such an alkaline stage that takes place pressurized within a pressure range of 1-20, preferably 6-12 bar (abs.) at the mixing point. The oxygen stage can comprise one, two or even several steps, whereby each reaction step comprises chemical mixing and a reaction vessel or reaction retention accomplished by means of a tube. If the process is performed in two reactors, the second (booster) pump is typically arranged in the pulp line between the reactors for increasing the pressure of the pulp.

BRIEF DESCRIPTION OF THE DRAWINGS

The present invention is described in more detail by means of an embodiment according to the invention and with reference to the accompanying schematic drawings, in which.

DETAILED DESCRIPTION OF THE INVENTION

Figure 1:
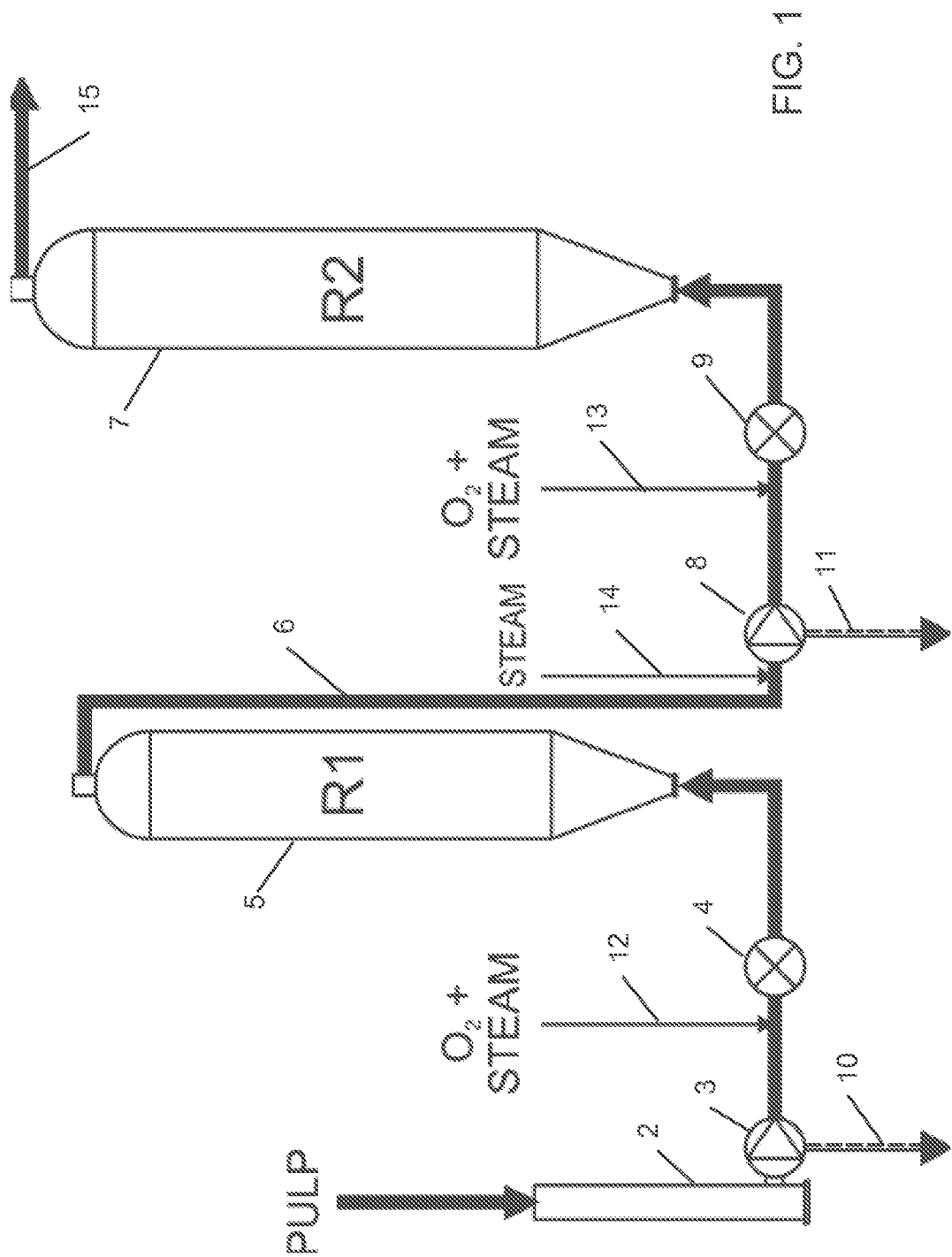
FIG. 1 is a schematic illustration of an oxygen delignification process in connection which the new method and arrangement may be applied.
Figure 2A:
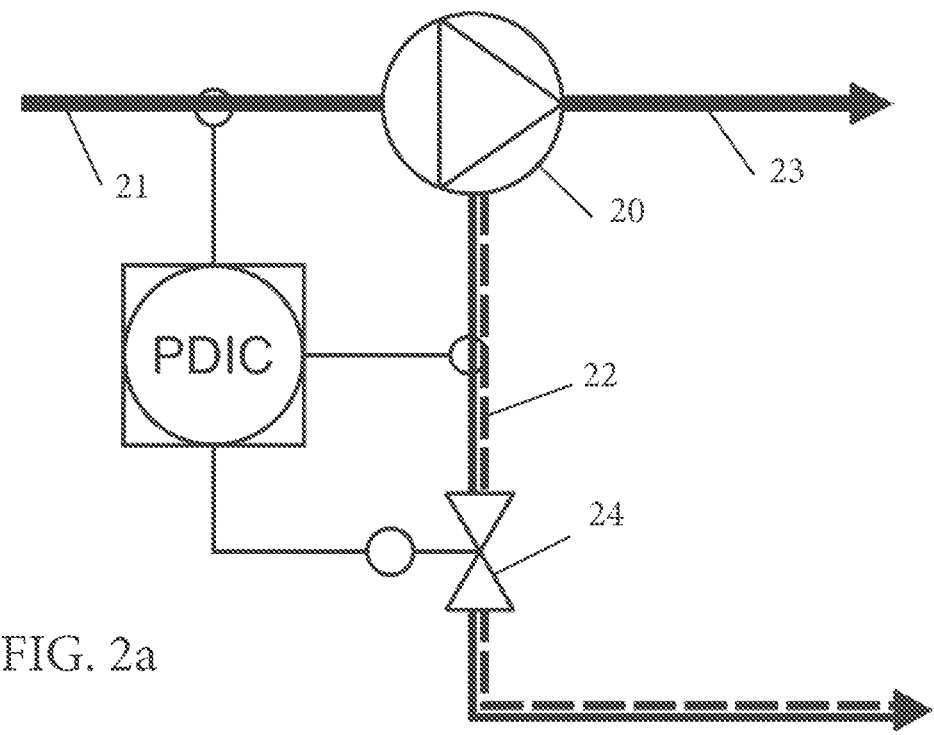
FIGS. 2a and b is a schematic illustration of known degassing arrangements of a booster MC pump.
Figure 2B:
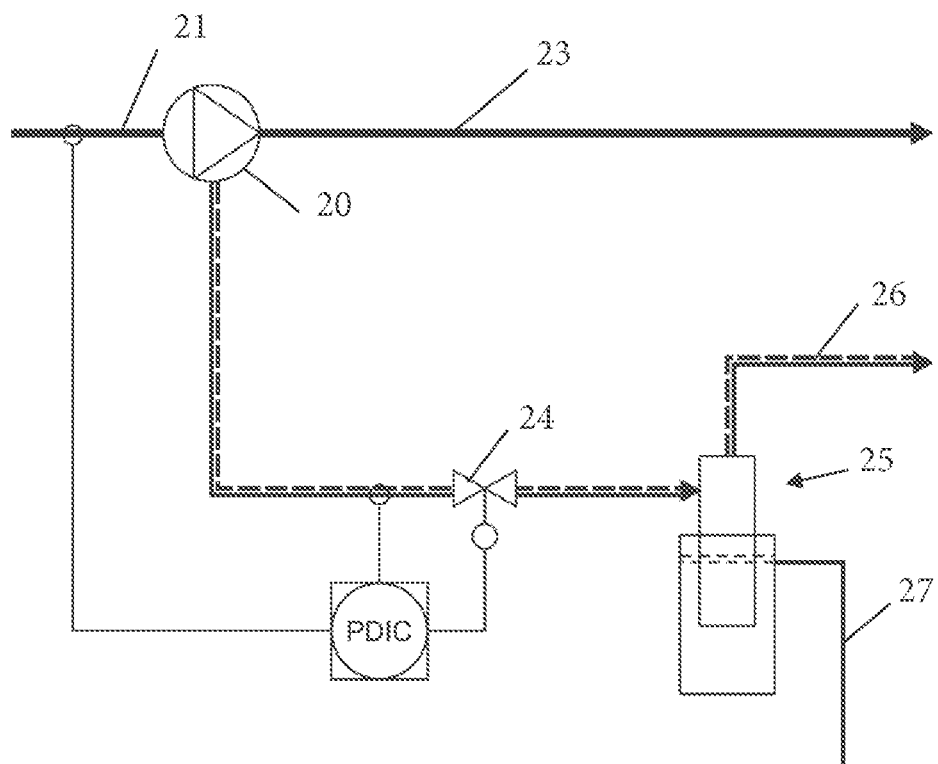
Figure 3:
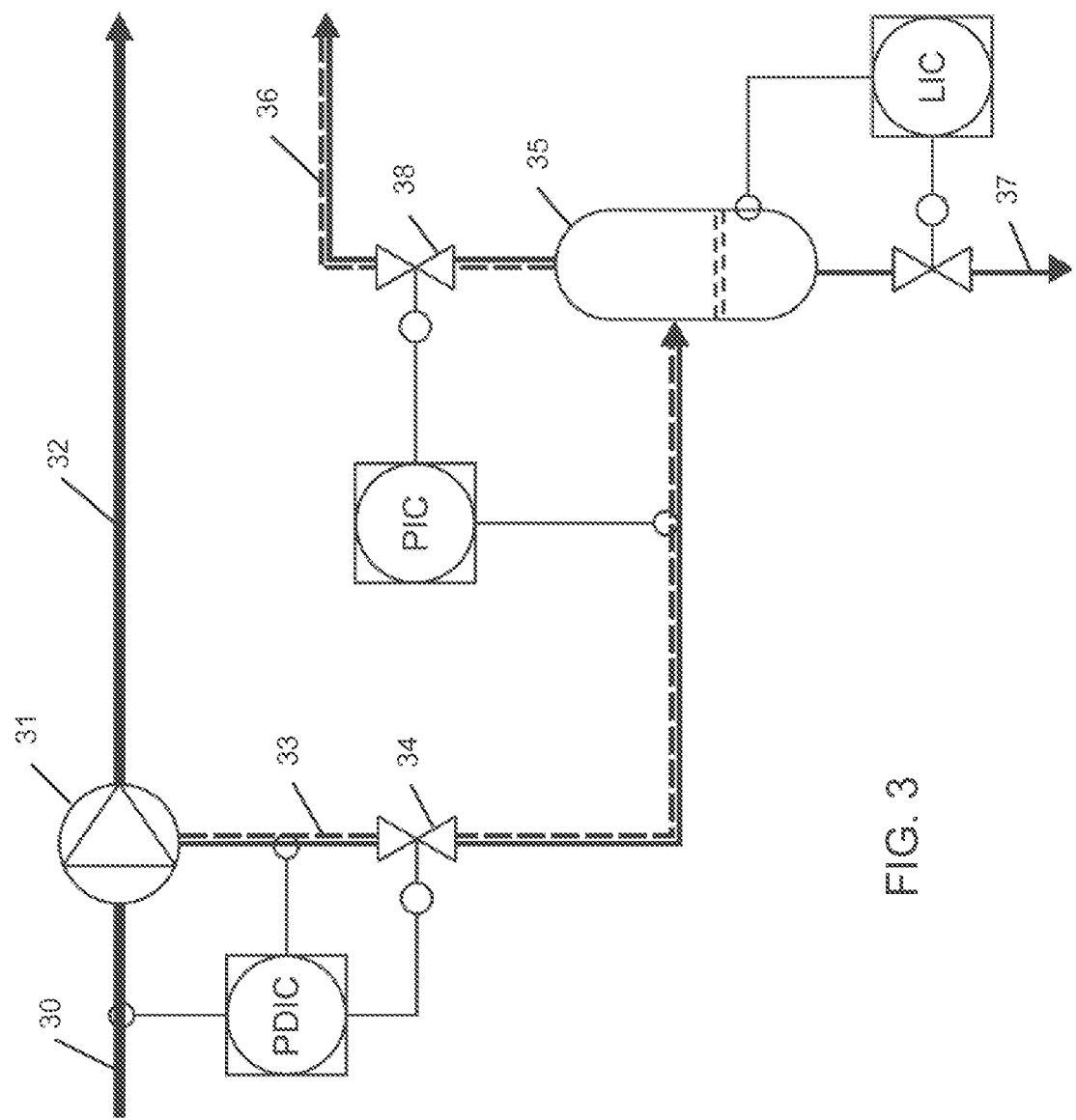
FIG. 3 shows an arrangement of an embodiment of the present invention.

FIG. 3 shows an embodiment of the new method. Pulp having a consistency of 6-16% in line 30 is typically discharged from a pulp treatment reactor, as shown in FIG. 1, in which the pulp is discharged from the oxygen delignification reactor 5. The pulp in line 30 is typically fed by a degassing MC pump 31 through line 32 to a second reactor (reactor 8 in FIG. 1). The pump 31 works as a booster pump for raising the pressure of the pulp.

In the MC pump 31 air or gas is separated from the pulp, and then discharged from the pump to a degassing conduit 33 by creating a certain pressure difference between the inlet side and the degassing chamber of the pump. Typically the degassing system of the booster MC pump 31 consists of pressure measurements in the inlet 30 of the pump and in the degassing conduit 33 that is connected to the degassing chamber of the pump. The pulp is removed from the pump through a conduit 32. The degassing conduit 33 (gas discharge conduit) comprises a degassing valve 34. The difference in pressure between the inlet of the pump and the degassing (gas discharge) is measured by a pressure gauge. The difference is compared with a set value and the degassing valve is controlled by a controller, such as a pressure differential indicator controller (PDIC), to maintain differential pressure at a desired level.

The degassing conduit 33 is connected to a pressurized degassing vessel 35, which is also a water separation chamber. The water separator chamber in which water is removed from the separated gas is also equipped with a drainage conduit 37 for regulating a liquid level in the water separator vessel 35. The water separator chamber 35 has a vent conduit 36, which is connected to a ventilation system or atmosphere. According to the present invention the water separation vessel is working under overpressure. The vent conduit is provided with a valve 38 which is adjusted to maintain a desired overpressure in the water separation chamber. The pressure is adjusted to be high enough to control and damp unforeseen changes over the degassing valve 34. The pressure set point is adjusted so that the pressure in the water separation chamber is in a range of 0.1-2.0 bar (g), preferably 0.3-1 bar (g). The water separation chamber is located at a lower elevation than the valves 34 and 38.

The water separator chamber in which water is removed from the separated gas is also equipped with a drainage conduit 37 for regulating a liquid level in the water separator vessel 35. There has to be a liquid level in the water separator chamber so that the chamber can be pressurized and the gas flow can be directed to the top of the chamber and further to the vent conduit. The gas volume is controlled with the liquid level control (LIC) circuit in the drainage conduit 37. The gas volume is also be adjusted within certain limits.

The pulp fed to the booster pump may contain fluctuating amounts of air or other gases, which are separated in the pump and tend to accumulate to the pump, if the gases are not discharged from the pump in suitable amounts. The pressurization of the water separation vessel decreases the volume flow of the off-gas from the degassing valve 34, which will reduce the capability of the off-gas flow to take along pulp fibers. The opening of the degassing valve is typically in the same range as in a corresponding atmospheric system, although the gas volume flow rate is smaller but the pressure difference is also lower. This means that the off-gas velocity in the degassing conduit 33 of the pump and in the degassing valve 34 is smaller.

Figure 4:
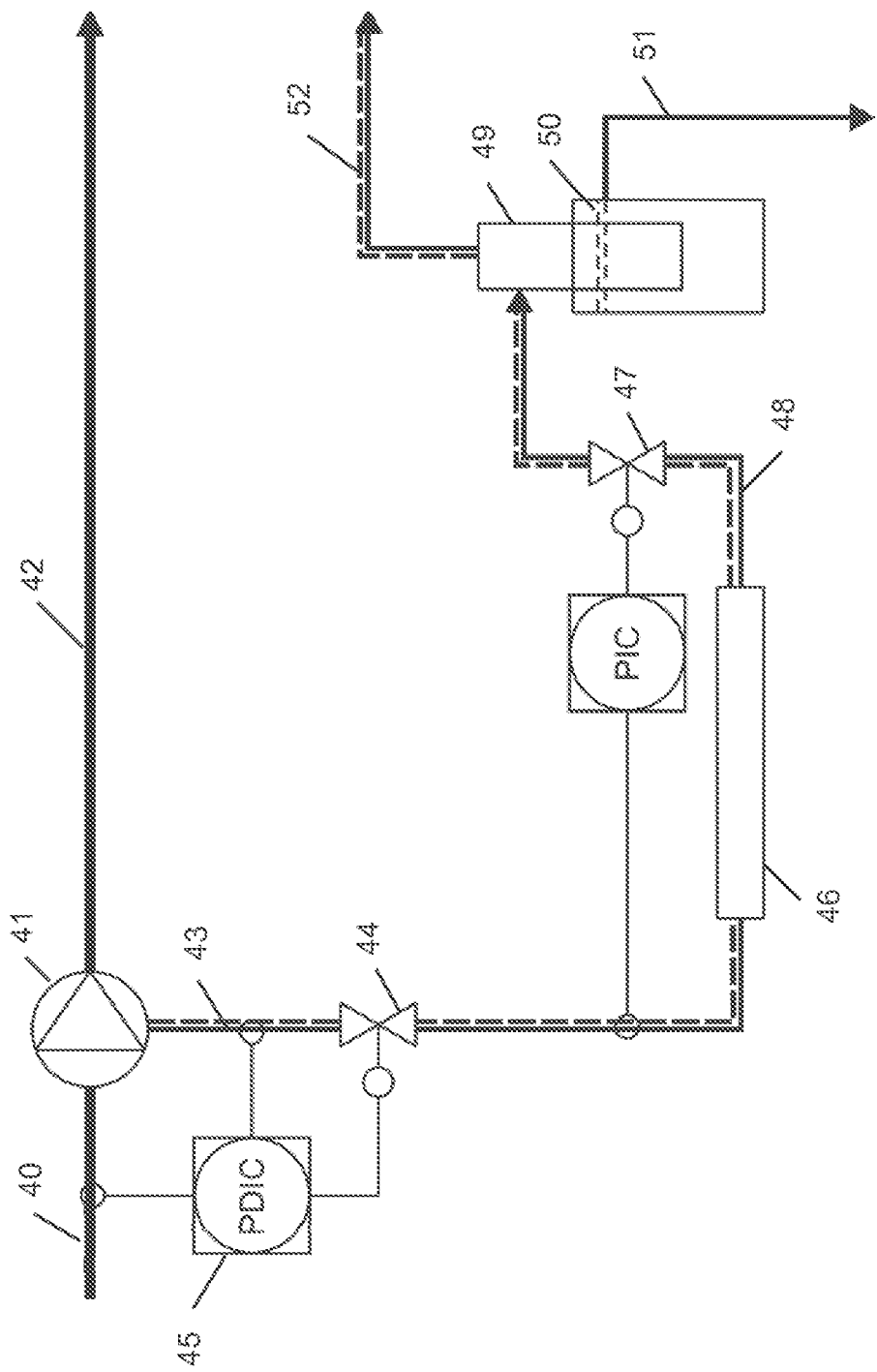
FIG. 4 shows an arrangement of another embodiment of the present invention.

FIG. 4 shows another embodiment of the new method. Pulp having a consistency of 6-16% in line 40 is typically discharged from a pulp treatment reactor, as shown in FIG. 1, in which the pulp is discharged from the oxygen delignification reactor 5. The pulp in line 40 is fed by a degassing MC pump 41 through line 42 to a second reactor (reactor 7 in FIG. 1). The pump 41 works as a booster pump for raising the pressure of the pulp.

In the MC pump 41 air or gas is separated from the pulp, and then discharged from the pump to a degassing conduit 43 by creating a certain pressure difference between the inlet side and the degassing chamber of the pump 41. Typically the degassing system of the booster MC pump 41 consists of pressure measurements in the inlet 40 of the pump and in the degassing conduit 43 that is connected to the degassing chamber of the pump 41. The pulp is removed from the pump through a conduit 42. The degassing conduit 43 (gas discharge conduit) comprises a degassing valve 44. The difference in pressure between the inlet of the pump and the degassing (gas discharge) is measured by a pressure gauge. The difference is compared with a set value and the degassing valve is controlled by a controller, such as a pressure differential indicator controller (PDIC) 45, to maintain differential pressure at a desired level.

The degassing conduit 43 is connected to a pressurized degassing vessel 46. The vessel is a pipe 46 which is located horizontally and has a sufficient diameter and length. The pressure is controlled by a pressure control valve 47 in the outlet conduit 48 of the vessel 46. The overpressure in the vessel and volume of the vessel allows damping quick pressure changes in the degassing valve 44. The pressure control valve 47 is adjusted to maintain a desired overpressure in the vessel 46. The pressure is adjusted to be high enough to control and damp unforeseen changes over the degassing valve 44. The pressure set point is adjusted so that the pressure in the water separation chamber is in a range of 0.1-2.0 bar (g), preferably 0.3-1 bar (g).

The pressurized degassing vessel 46 is further connected through the conduit 48 to a separate unpressurized water separation chamber 49 having a liquid level 50 and a gas space above the liquid level and a drainage conduit 51 for regulating a liquid level in the chamber. The water separator chamber further comprises a vent conduit 52 for providing an outlet for separated gas.

In FIG. 4, at least a portion of the degassing conduit 43 and at least a portion of the outlet conduit 48 travel vertically. Preferably, the degassing valve 44 of the degassing conduit is located at a higher elevation than the pressure control valve 47 of the outlet line. The degassing vessel 46 is located at a lower elevation than the valves 44 and 47.

The new arrangement allows a stable operation of a booster MC pump in a pulp treatment system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. An arrangement configured to control a gas flow separated from a suspension of medium consistency pulp in a pulp treatment apparatus, the arrangement comprising:
a first pump and a second pump, wherein the first pump pumps the suspension as the suspension flow to a first reactor and the second pump pumps the suspension as the suspension flows from the first reactor to a second reactor, wherein the second pump is a degassing centrifugal pump with a degassing system, and
the degassing system comprises:
a degassing conduit configured to receive gases from the second pump;
a degassing valve connected to the degassing conduit and the degassing valve is configured to regulate a pressure difference in a flow of the gases between an inlet of the second pump and the degassing conduit, and
a pressurized degassing vessel downstream of the degassing valve in the flow of the gases through the degassing conduit, wherein the pressurized degassing vessel is pressurized to above atmospheric pressure in an overpressure condition, and the pressurized degassing vessel includes an inlet and an outlet, wherein the outlet of the degassing vessel is connected to a pressure control valve configured to maintain the overpressure condition of the degassing vessel.

2. The arrangement according to claim 1, wherein the pressurized degassing vessel includes a horizontal pipe, wherein an inlet of the horizontal pipe is connected to the degassing conduit, and an outlet of the horizontal pipe is connected to an outlet conduit connected to the degassing valve.

3. The arrangement according to claim 2, wherein the degassing system further comprises:

a water separator connected to the degassing conduit and downstream of the degassing valve, wherein the water separator includes an unpressurized chamber, a vent conduit in an upper part of the unpressurized chamber, and a drainage conduit connected to an outlet of the unpressurized chamber and configured to adjust a water level in the unpressurized chamber.

4. The arrangement according to claim 1, wherein the pressurized degassing vessel includes a pressurized water separator chamber having a liquid level and a gas space above the liquid level, and a vent conduit, in which the degassing valve is arranged to maintain the overpressure condition in the pressurized water separator chamber, and the pressurized water separator chamber further comprises a drainage conduit and a valve configured to regulate the liquid level in the pressurized water separator chamber.

5. The arrangement according to claim 2, wherein a diameter of the horizontal pipe is at least 50 mm.

6. The arrangement according to claim 1, wherein a volume of the pressurized degassing vessel is in a range of 0.01 m$^3$ to 1.0 m$^3$.

7. The arrangement according to claim 1, wherein the pressurized degassing vessel is configured to operate at a pressure in a range of 0.1 bar(g) to 4.0 bar(g).

8. The arrangement according to claim 1, wherein pressure in the pressurized degassing vessel includes a vent to release pressurized gas to atmosphere and the overpressure condition in the pressurized degassing vessel is regulated by a vent valve coupled to the vent.

9. The arrangement according to claim 8, further comprising a controller configured to actuate the vent value to maintain the overpressure condition in the pressurized degassing vessel and the controller is configured to adjust pressure in the pressurized degassing vessel based on a pressure of a suction side of the second pump.

10. The arrangement according to claim 9, wherein the controller is configured to adjust the pressure in the pressurized degassing vessel by increasing the pressure in the pressurized degassing vessel in response to an increase in the pressure that the suction side of the second pump.

* * * * *